(12) United States Patent
Nagami

(10) Patent No.: US 10,444,576 B2
(45) Date of Patent: Oct. 15, 2019

(54) LIQUID CRYSTAL DISPLAY DEVICE

(71) Applicant: Japan Display Inc., Tokyo (JP)

(72) Inventor: Takahiro Nagami, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/724,988

(22) Filed: Oct. 4, 2017

(65) Prior Publication Data

US 2018/0039113 A1    Feb. 8, 2018

Related U.S. Application Data

(63) Continuation of application No. 14/971,863, filed on Dec. 16, 2015, now abandoned, which is a continuation of application No. 13/279,495, filed on Oct. 24, 2011, now Pat. No. 9,268,181.

(30) Foreign Application Priority Data

Nov. 1, 2010    (JP) ................................ 2010-245416

(51) Int. Cl.
    *G02F 1/1345*      (2006.01)
    *G02F 1/1343*      (2006.01)
    *G02F 1/1362*      (2006.01)
    *G02F 1/1368*      (2006.01)

(52) U.S. Cl.
CPC .......... *G02F 1/1345* (2013.01); *G02F 1/1368* (2013.01); *G02F 1/13439* (2013.01); *G02F 1/13452* (2013.01); *G02F 1/136286* (2013.01)

(58) Field of Classification Search
CPC ........................... G02F 1/1345; G02F 1/13452
See application file for complete search history.

(56) References Cited

U.S. PATENT DOCUMENTS

| | | | |
|---|---|---|---|
| 9,268,181 B2 | 2/2016 | Nagami | |
| 2001/0013915 A1 | 8/2001 | Song | |
| 2004/0135956 A1 | 7/2004 | Kim et al. | |
| 2006/0139544 A1 | 6/2006 | Ko et al. | |
| 2008/0157364 A1* | 7/2008 | Yang | G02F 1/1345 257/741 |
| 2008/0203391 A1* | 8/2008 | Kim | G02F 1/1345 257/59 |
| 2009/0184946 A1 | 7/2009 | Ahn et al. | |

(Continued)

FOREIGN PATENT DOCUMENTS

| | | |
|---|---|---|
| JP | 10-339880 | 12/1988 |
| JP | 06-067191 | 3/1994 |

(Continued)

*Primary Examiner* — Alexander P Gross
(74) *Attorney, Agent, or Firm* — Ulmer & Berne LLP

(57) ABSTRACT

A drain layer lead line connecting an image signal line and a terminal of an IC driver is interrupted in the middle, and the gap is bridged by bridging ITO that is formed at the same time as pixel ITO. Thus, the difference in the length of the lead lines is adjusted such that the length of the bridging ITO in the lead line connected to the terminal in the center of the IC driver is longer than the length of the bridging ITO in the lead line connected to the terminal in the end of the IC driver to reduce the difference in the wiring resistance of the lead lines due to the difference in the length of the lead lines depending on the location.

8 Claims, 21 Drawing Sheets

(56) References Cited

U.S. PATENT DOCUMENTS

| | | | |
|---|---|---|---|
| 2009/0315854 A1* | 12/2009 | Matsuo | G06F 3/0412 |
| | | | 345/174 |
| 2010/0038642 A1 | 2/2010 | Choi et al. | |
| 2010/0134710 A1 | 6/2010 | Ishitani et al. | |
| 2010/0265447 A1 | 10/2010 | Seo et al. | |
| 2014/0319530 A1* | 10/2014 | Chung | G02F 1/134363 |
| | | | 257/72 |

FOREIGN PATENT DOCUMENTS

| | | |
|---|---|---|
| JP | 08-160444 | 6/1996 |
| JP | 2004-70317 A | 3/2004 |
| JP | 2010-60967 A | 3/2010 |
| JP | 2010-66396 A | 3/2010 |
| JP | 2010-156960 A | 7/2010 |

* cited by examiner

LIQUID CRYSTAL DISPLAY DEVICE

CLAIM OF PRIORITY

The present application is a continuation of U.S. patent application Ser. No. 14/971,863, filed on Dec. 16, 2015, which is a continuation of U.S. patent application Ser. No. 13/279,495, filed on Oct. 24, 2011, which issued as U.S. Pat. No. 9,268,181 on Feb. 23, 2016, and which claims priority from Japanese Patent Application JP 2010-245416 filed on Nov. 1, 2010. The entire disclosures of each of these applications are hereby incorporated herein by reference.

FIELD OF THE INVENTION

The present invention relates to a display device, and more particularly, to a liquid crystal display device designed to prevent uneven brightness due to wiring resistance.

BACKGROUND OF THE INVENTION

In a liquid crystal display panel used for a liquid crystal display device, there is provided a TFT substrate in which pixels each having a pixel electrode, a thin film transistor (TFT), and the like are arranged in a matrix form. There is also provided a counter substrate disposed opposite to the TFT substrate, in which color filters and the like are formed at positions corresponding to the pixel electrodes of the TFT substrate. Then, a liquid crystal is interposed between the TFT substrate and the counter substrate. Thus, an image is formed by controlling the transmittance of light from liquid crystal molecules for each pixel.

In the display area of the liquid crystal display device, for example, scan lines extend in the horizontal direction and are arranged at a predetermined pitch in the vertical direction. Further, image signal lines extend in the vertical direction and are arranged at a predetermined pitch in the horizontal direction. Image signals or scan signals are transmitted to the image signal lines or the scan lines from an IC driver. The terminal pitch of the IC driver is smaller than the pitch of the image signal lines or the pitch of the scan lines. Thus, the length of the lead line between the terminal of the IC driver and the image signal line or scan line is different depending on the location of the liquid crystal display panel.

Because of the difference in the length of the lead line, the electrical resistance between the terminal of the IC driver, and the image signal line or the scan line differs depending on the location. This results in the difference in the brightness depending on the location. In order to prevent this phenomenon, JP-A No. 67192/1994 describes a configuration in which each lead line has a wider area, in order to equalize the resistance of the lead lines by adjusting the range of the wider area of each lead line.

JP-A No. 16044/1996 describes a configuration for the case in which a material with a relatively high resistance such as indium tin oxide (ITO) is used for the lead lines. In this case, the influence of the lead line resistance is particularly significant, so that a metal with a relatively low resistance such as Al is used as a laminated material, in addition to the material with relatively high resistance such as ITO.

SUMMARY OF THE INVENTION

Along with the development of high definition screen in the liquid crystal display device, the terminal pitch of an IC driver becomes smaller to reduce costs of the IC driver. Thus, the pitch of lead lines also becomes smaller. As a result, it is difficult to have enough room to increase the width of a portion of the lead line as described in JP-A No. 67192/1994.

Further, in the configuration in which a low-resistance metal is laminated on the lead line as described in JP-A No. 16044/1996, a low-resistance metal is originally used for the lead line. In this case, a further effect of equalizing the resistance of the lead line would not be expected.

Another method of equalizing the resistance of a lead line 30 is to increase the resistance of a lead line 35 to a desired value. In this case, as shown in FIG. 28, the length of the lead line 35 is increased by snaking the lead line 35 in order to adjust the resistance. However, also in this method, it is difficult to have enough room to snake the lead line when the pitch of the lead lines becomes small.

The present invention aims to achieve a configuration in which the resistance value of lead lines can be equalized even if the pitch of the lead lines becomes small without adding additional process steps. Then, it is desirable to achieve a liquid crystal display device having uniform screen brightness.

The present invention is to solve the above problem, and a key aspect of the present invention is as follows. There is provided a liquid crystal display device including a display area in which scan lines extending in a first direction are arranged at a first pitch in a second direction, image lines extending in the second direction are arranged at a second pitch in the first direction, and pixels are arranged in a matrix form. Further, an IC driver having a rectangular shape is provided on the outside of the display area of the liquid crystal display device. The IC driver has terminals arranged at a third pitch. The third pitch is smaller than the first pitch or the second pitch. The image signal line is connected to the IC driver by a lead line. The lead line has a connecting portion connected to the image signal line, a diagonal wiring portion extending in the diagonal direction with respect to the second direction, and a straight wiring portion extending in the second direction with the third pitch and connected to the IC driver. In the straight wiring portion, the lead line is bridged by bridging ITO. The length of the bridging ITO in the lead line connected to the terminal in the center in a longitudinal direction of the rectangular IC driver is longer than the length of the bridging ITO in the lead line connected to the terminal on the outside in the longitudinal direction of the rectangular IC driver. In this way, the resistance of the lead lines is equalized. The same configuration can be applied to the lead lines connecting the scan lines and the IC driver.

As another aspect of the present invention, the wiring terminals corresponding to the IC driver are not connected to the lead lines. In this case, each wiring terminal is connected to the end of each lead line by ITO covering both the end of the lead line and the wiring terminal. At this time, the length of the ITO covering the wiring terminal corresponding to the center of the CI driver is longer than the length of the ITO covering the wiring terminal corresponding to the end of the IC driver. Thus, the resistance of the lead lines is equalized.

Further, when the lead lines have a small pitch and are arranged in a two-layer wiring structure, the layer of the image signal lines is connected to the layer of the scan lines by bridging ITO. At this time, the length of the bridging ITO in the lead line corresponding to the terminal in the center of the IC driver is longer than the length of the bridging ITO in the lead line corresponding to the terminal in the end of the IC driver. Thus, the resistance of the lead lines is equalized.

According to the present invention, it is possible to equalize the resistance of the lead lines connecting the display area and the IC driver. This makes it possible to reduce the uneven brightness due to the wiring resistance in the display area. Further, the configuration according to the present invention can be produced in the same process as the existing production process. Thus, the production cost of the liquid crystal display device will not be increased.

DETAILED DESCRIPTION OF THE PREFERRED EMBODIMENTS

Figure 1:
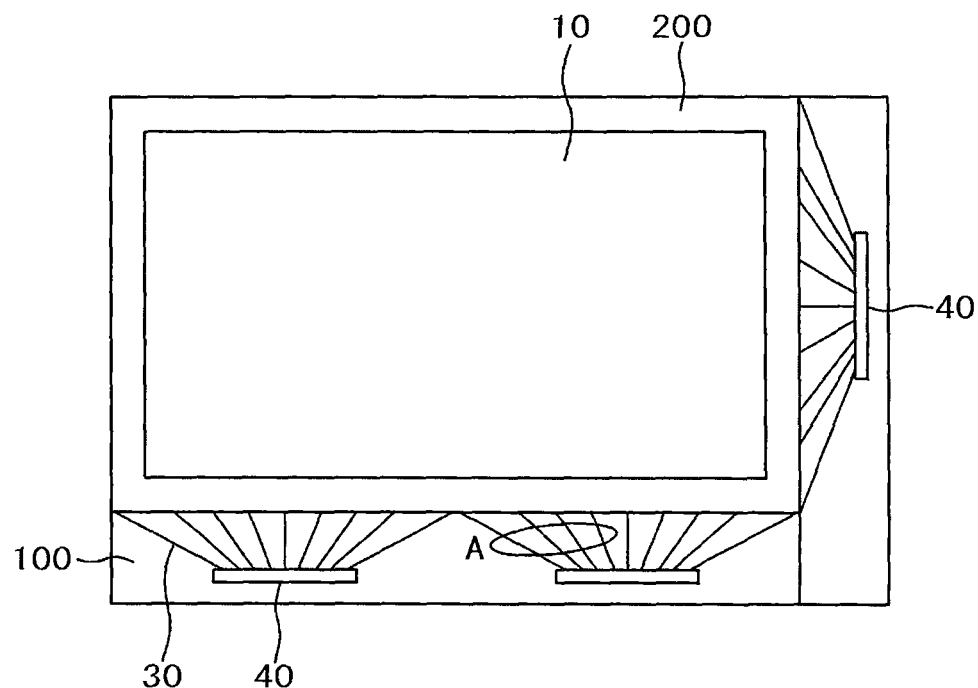
FIG. 1 is a plan view of a liquid crystal display device.

FIG. 1 is a plan view of a liquid crystal display device to which the present invention is applied. In FIG. 1, a counter substrate 200 is provided on a TFT substrate 100 in which TFTs and pixels are formed. A liquid crystal layer not shown is interposed between the TFT substrate 100 and the counter substrate 200. A display area 10 is present where the TFT substrate 100 and the counter substrate 200 overlap each other. In the display area 10, scan lines not shown extending in the horizontal direction are arranged at a predetermined pitch in the vertical direction. Further, image signal lines not shown extending in the vertical direction are arranged at a predetermined pitch in the horizontal direction. The scan lines or image signal lines are connected to an IC driver 40 by lead lines.

The pitch of the IC driver 40 is smaller than the pitch of the image signal line or the pitch of the scan line. Thus, the ends of the scan lines or image signal lines are connected to terminals of the IC driver 40 by diagonal lines as shown in FIG. 1. In this case, the lead line connected to the end of the IC driver 40 is the longest. The closer to the center of the IC driver 40 the lead line is, the shorter the length of the lead line. Thus, the resistance from the IC driver 40 varies depending on the location of the scan line or image signal line. This difference results in the difference in the amplitude of the signal, so that the screen brightness is different depending on the location.

Figure 2:
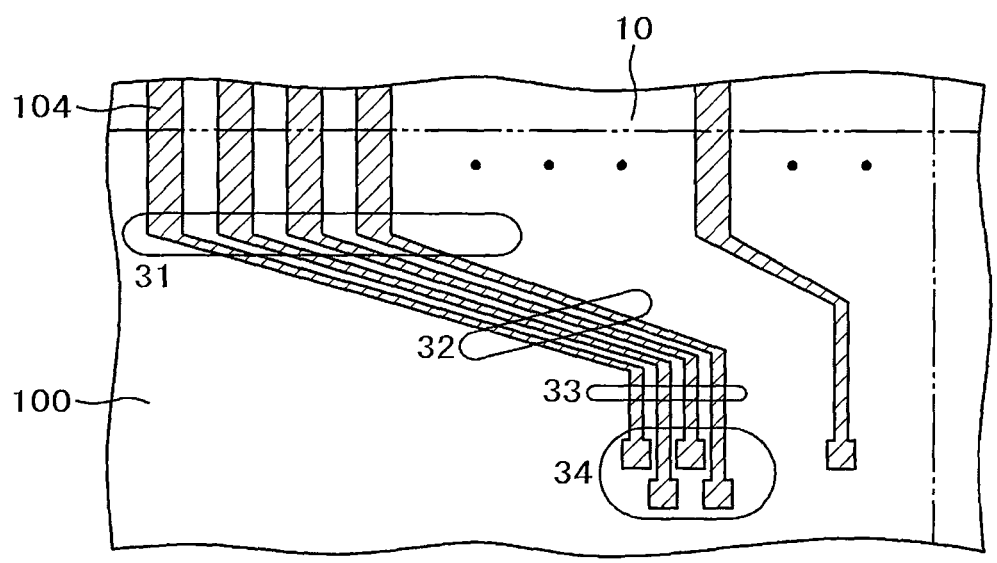
FIG. 2 is a detailed plan view of a portion of the lead lines in the liquid crystal display device.

FIG. 2 is a detailed plan view of the shape of the lead lines, for example, which corresponds to A part of FIG. 1. In FIG. 2, the image signal lines extend from the display area 10 and are connected to the lead lines 30 in a connecting portion 31. The lead lines reach the terminal portion 34 through a diagonal wiring portion 32 and a straight wiring portion 33. The width of each wiring terminal should be larger than the width of the lead line 30. Thus, the wiring terminals are arranged in a staggered fashion. The wiring terminals are connected to the terminals of the IC driver 40.

As shown in FIG. 2, the closer to the end of the IC driver, the longer the length of the lead line 30. Further, the line width of the diagonal wiring portion 32 is smaller than the line width of the connecting portion 31 or than the straight wiring portion 33. The lead line 30 is formed of the same material as the scan line or the image signal line. For example, the scan line is formed of an AlNb alloy, and the image signal line is formed of MoW. The present invention aims to equalize the resistance of the lead lines. In the present invention, a portion of the lead line 30 is bridged by ITO that is different from the material of the scan line or the material of the image signal line. In this way, the resistance of the lead line 30 is adjusted to make the resistance approximately equal in all the lead lines 30. This ITO will sometimes be referred to as bridging ITO.

In other words, the resistance of the ITO is 50 to 60 times higher than the resistance of AlNd or MoW, and the like. For this reason, the longer the length of the ITO the higher the resistance of the lead line 30 can be achieved. In other words, the length of the bridging ITO is increased as the lead line 30 approaches the center of the IC driver 40. There is no need to bridge the outermost lead line 30 by ITO.

Preferably, the bridging by the bridging ITO is performed in the straight wiring portion 33, the terminal portion 34, or the connecting portion 31, because the line width can be relatively large in these portions. As shown in FIG. 2, the wiring width tends to be reduced in the diagonal wiring portion 32. Thus, it is difficult to form the bridging ITO in the diagonal wiring portion 32 in terms of processing accuracy. The following embodiment describes a configuration for adjusting the resistance of the lead line 30 in the straight wiring portion 33, the terminal portion 34, and the connecting portion 31.

The method of bridging by ITO is affected by the layer structure of the liquid crystal display device. In other words, the terminal portion 34 or the lead line 30 is formed at the same as the display area 10, so that the optimal configuration is different for each structure of the display area 10. This embodiment describes the configuration of the in-plane switching (IPS) liquid crystal display device to which the present invention is applied.

In the liquid crystal display device, the viewing angle characteristics are a problem. The viewing angle is a phenomenon in which the brightness changes or the color changes between when the screen is viewed from the front, and when the screen is viewed from the diagonal direction. The viewing angle characteristics are excellent in the IPS mode in which liquid crystal molecules are driven by the electric field in the horizontal direction.

There are many different types of IPS mode. For example, a pixel electrode 106 is formed in a rectangular shape, on which a common electrode 108 having a slit 1081 is disposed with an insulating film interposed therebetween. In this way, the liquid crystal molecules are rotated by the electric field generated between the common electrode 108 and the pixel electrode 106. This method can reduce the number of layers and is becoming a mainstream IPS mode. As described below there are three types of this method, which are called IPSLITE 1, IPSLITE 2, and IPSLITE 3 in this specification. There is another method in which the common electrode 108 is formed in a planar shape, on which the pixel electrode 106 having a slit is disposed with the insulating film interposed therebetween, so that liquid crystal molecules 400 are rotated by the electric field generated between the pixel electrode 106 and the common electrode 108. This method will be referred to as IPSPRO.

Figure 3:
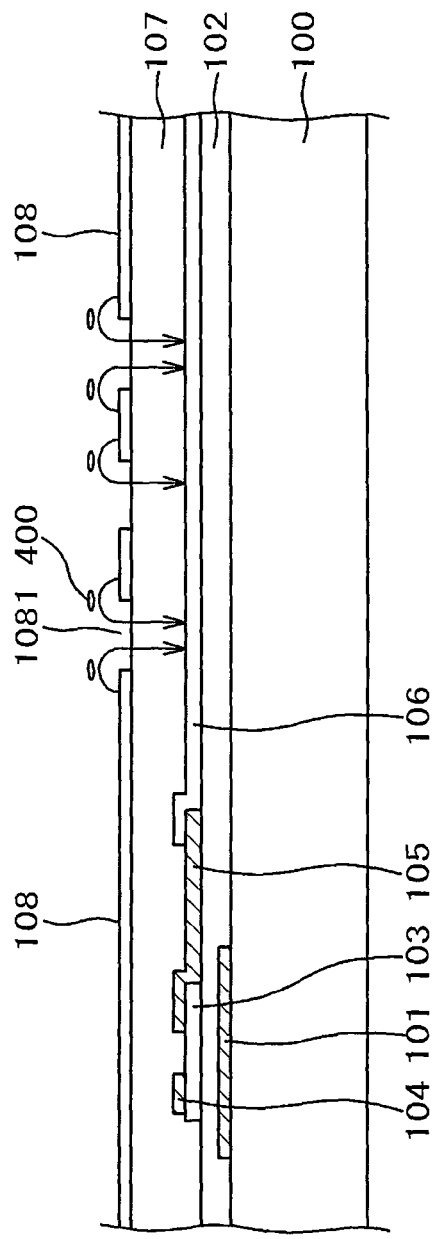
FIG. 3 is a cross-sectional view of a pixel portion in IPSLITE 1.

FIG. 3 is a cross-sectional view of a pixel portion in IPSLITE 1. In FIG. 3, a gate electrode 101 is formed on the TFT substrate 100. Then, a gate insulating film 102 is formed and covers the gate electrode 101. For example, the gate electrode 101 is formed of AlNd, and the gate insulating film 102 is formed of SiN. A semiconductor layer 103 is formed of, for example, a-Si on the gate electrode 101 with the gate insulating film interposed therebetween. A drain electrode 104 and a source electrode 105 are placed opposite to each other on the semiconductor layer 103. The drain electrode 104 is connected to the image signal line. For example, the drain electrode 104 and the source electrode 105 are formed of MoW.

The pixel electrode 106 connected to the source electrode 105 is formed of ITO on the gate insulating film 102. In the case of IPSLITE 1 shown in FIG. 3, the source electrode 105 is formed prior to the formation of the pixel electrode 106, so that the pixel electrode 106 overlaps a portion of the source electrode 105 to establish connection between the pixel electrode 106 and the source electrode 105. An inorganic passivation film 107 is formed of SiN, covering the TFT and the pixel electrode 106. The common electrode 108 having the slit 1081 is formed in a planar shape on the passivation film 107. When an image signal is applied to the pixel electrode 106, electric field lines are generated between the common electrodes 108 through the slit 1081. The liquid crystal molecules 400 are rotated by the electric field lines to control the transmittance of light from a backlight for each pixel, and thus an image is formed. Note that, as shown in FIG. 3, the pixel includes the TFT, the pixel electrode, and the common electrode, but also the transmission part for controlling the light from the backlight. The configuration is the same as in FIG. 4 (IPSLITE 2), FIG. 5 (IPSLITE 3), and FIG. 6 (IPSPRO), all of which will be described below.

Figure 4:
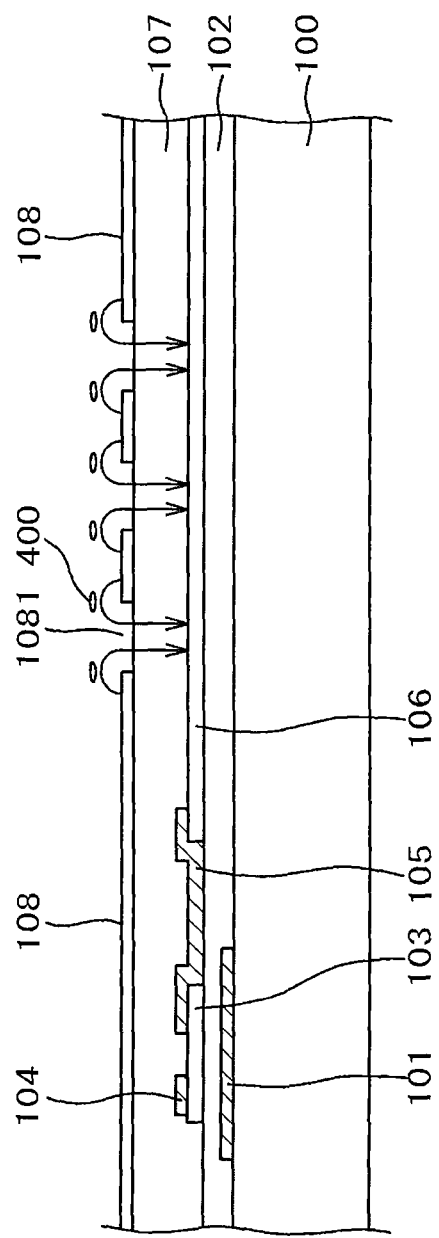
FIG. 4 is a cross-sectional view of a pixel portion in IPSLITE 2.

FIG. 4 is a cross-sectional view of a pixel portion in IPSLITE 2. FIG. 4 is different from FIG. 3 in that the pixel electrode 106 of ITO is formed prior to the formation of the source electrode 105 on the gate insulating film 102. Thus, in FIG. 4, the source electrode 105 overlaps a portion of the pixel electrode 106 to establish connection between the source electrode 105 and the pixel electrode 106. This configuration can solve the problem that when the ITO, which is the pixel electrode 106, is developed by a developer, the image signal line, the drain electrode 104, the source electrode 105, and the like are corroded by the developer. The other configuration is the same as the configuration in FIG. 3 and the description thereof will be omitted.

Figure 5:
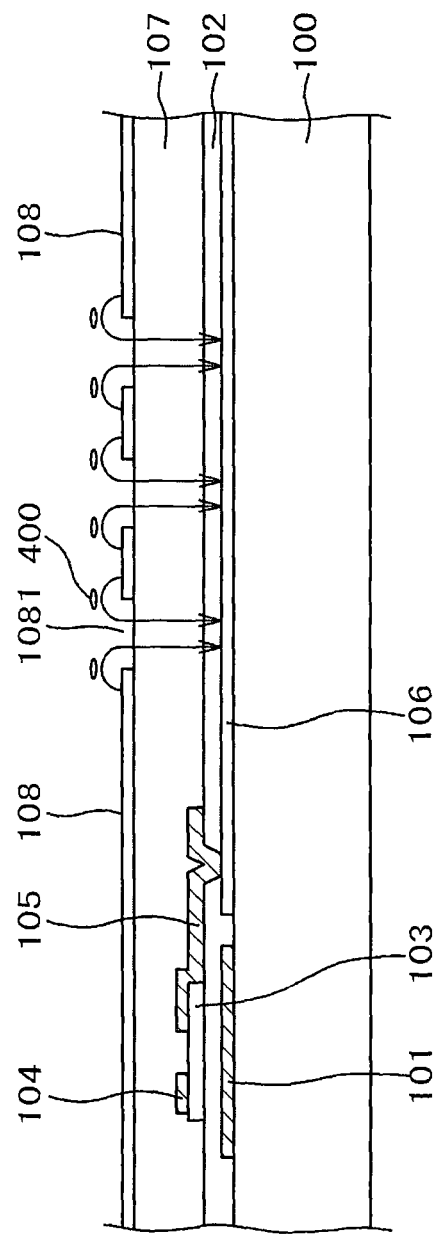
FIG. 5 is a cross-sectional view of a pixel portion in IPSLITE 3.

FIG. 5 is a cross-sectional view of a pixel portion in IPSLITE 3. In FIG. 5, the gate electrode 101 is formed on the TFT substrate 100. Further, the pixel electrode 106 of ITO is formed separately from the gate electrode 101 on the TFT substrate 100. The gate insulating film 102 is formed and covers both the gate electrode 101 and the pixel electrode 106. The semiconductor layer 103 is formed on the gate electrode 101 through the gate insulating film 102. The drain electrode 104 and the source electrode 105 are formed opposite to each other on the semiconductor layer 103.

A through hole is formed on the gate insulating film 102 to provide connection between the pixel electrode 106 and the source electrode 105. The inorganic passivation film 107 is formed and covers the TFT. The common electrode 108 having the slit 1081 is formed on the inorganic passivation film 107. When an image signal is supplied to the pixel electrode 106, electric field lines are generated through the slit 1081. The liquid crystal molecules 400 are controlled by the electric field lines. This is the same as in IPSLITE 1 and IPSLITE 2.

Figure 6:
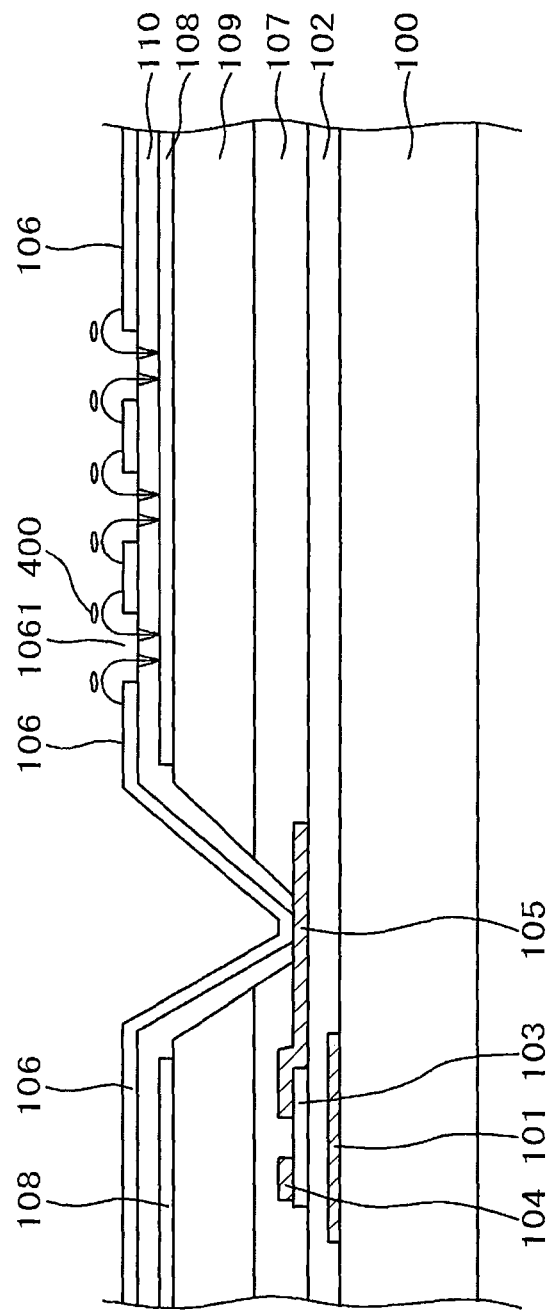
FIG. 6 is a cross-sectional view of a pixel portion in IPSPRO.

FIG. 6 is a cross-sectional view of a pixel portion in IPSPRO. In IPSPRO, the pixel electrode 106 having the slit 1061 is provided on the top layer. The common electrode 108 formed in a planar shape is provided below the pixel electrode 106 with an inter-layer insulating film 110 interposed therebetween. When electric field lines are generated between the pixel electrode 106 and the common electrode 108, the liquid crystal molecules 400 are rotated by the electric field lines to control the light transmitted through the liquid crystal layer.

In FIG. 6, the gate electrode 101 is formed on the TFT substrate 100. The gate insulating film 102 is formed and covers the gate electrode 101. The semiconductor layer 103 is formed through the gate insulating film 102 on the gate electrode 101. Then, the drain electrode 104 and the source electrode 105 are formed on the semiconductor layer 103. This is the same as in IPSLITE 1 or other modes. The inorganic passivation film 107 is formed and covers the TFT. Then, an organic passivation film 109, which is also served as a flattering film, is formed on the inorganic passivation film 107. The common electrode 108 is formed in a planar shape on the organic passivation film 109. The inter-layer insulating film 110 is formed and covers the common electrode 108. Then, the pixel electrode 106 having the slit 1081 is formed on the inter-layer insulating film 110. A through hole is formed in the organic passivation film 109, the inorganic passivation film 107, and the inter-layer insulating film 110, to ensure electrical continuity between the source electrode 105 of the TFT and the pixel electrode 106. The configuration of IPSPRO is different from the configuration of IPSLITE 1 or other modes in that the pixel electrode 106 is provided above the common electrode 108.

In FIG. 2, the lead lines 30 extend below the terminals in the terminal portion 34. The lead line 30 extending to the terminal may be formed of the same material as the drain electrode 104, or may be formed of the same material as the gate electrode 101. Hereinafter, if the material of the lead line 30 is the same as the drain electrode 104, it is called a drain layer lead line 302, and if the material of the lead line 30 is the same as the gate electrode 101, then it is called a gate layer lead line 301. The drain electrode 104 and the source electrode 105 or the image signal line are formed of the same material at the same time. Further, the gate electrode 101 and the scan line are formed of the same material at the same time.

Figure 7:
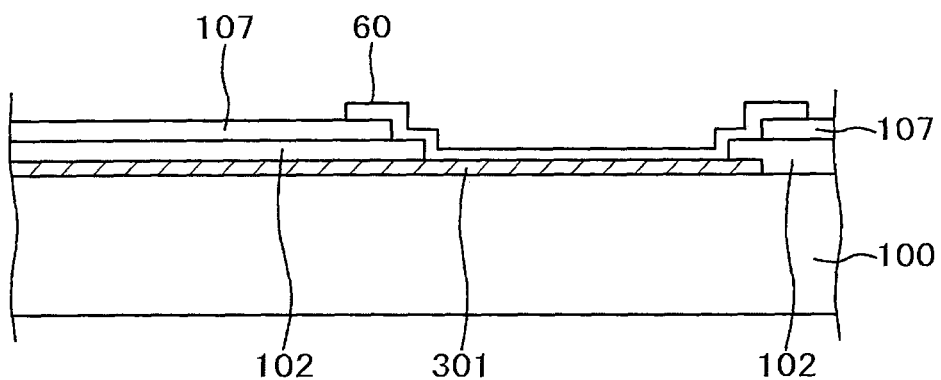
FIG. 7 is a cross-sectional view of a terminal portion when a gate layer lead line is extended to the terminal portion in IPSLITE 1, IPSLITE 2, and IPSLITE 3.

FIG. 7 is an example in which the gate layer lead line 301 extends to the terminal in PISLITE 1, IPSLITE 2, and IPSLITE 3. The gate layer lead line 301 is formed at the same time as the gate electrode 101, and the like. Because the AlNd used for the gate layer lead line 301 is corroded by contact with air, the gate layer lead line 301 is covered by the gate insulating film 102 and the inorganic passivation film 107, except for the portion that is connected to the terminal of the IC driver 40 to form a through hole. In order to prevent the AlNd from being corroded in the through hole, the portion of the through hole is covered by ITO. This ITO is formed at the same time as the common electrode 108 in IPSLITE 1 or other modes. In other words, the ITO is formed at the same time as the formation of the ITO on the upper side in FIGS. 3, 4, and 5. Hereinafter, the ITO used in the terminal portion 34 is referred to as the upper ITO.

Figure 8:
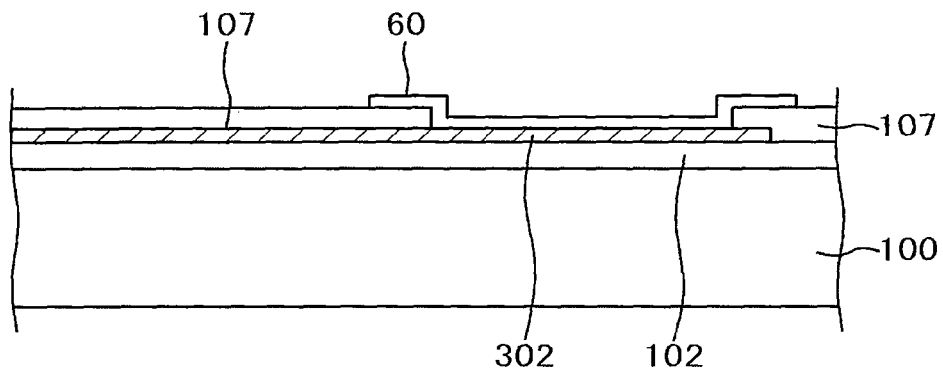
FIG. 8 is a cross-sectional view of a terminal portion when a drain layer lead line is extended to the terminal portion in IPSLITE 1, IPSLITE 2, and IPSLITE 3.

FIG. 8 is an example in which the drain layer lead line 302 extends to the terminal in IPSLITE 1, IPSLITE 2, and IPSLITE 3. The drain layer lead line 302 on the gate insulating film 102 is formed at the same time as the drain electrode 104 and the like. Because the MoW used for the drain layer lead line 302 is corroded by contact with air, the drain layer lead line 302 is covered by the inorganic passivation film 107, except for the portion that is connected to the terminal of the IC driver 40 to form a through hole. In order to prevent the MoW from being corroded in the through hold, the portion of the through hole is covered by the upper ITO 60.

Figure 9:
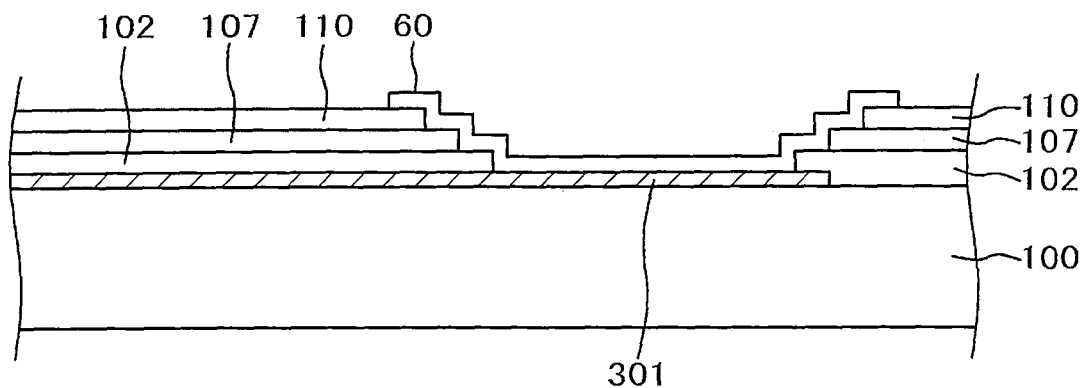
FIG. 9 is a cross-sectional view of a terminal portion when the gate layer lead line is extended to the terminal portion in IPSPRO.

FIG. 9 is an example in which the gate layer lead line 301 extends to the terminal in IPSPRO. The gate layer lead line 301 is formed at the same time as the gate electrode 101 and the like. FIG. 9 is different from FIG. 7 in that the inter-layer insulating film 110 is formed on the inorganic passivation film 107 and that the through hole of the terminal portion 34 is formed through the inter-layer insulating film 110, the inorganic passivation film 107, and the gate insulating film 102. Also in FIG. 9, the top layer of the terminal portion 34 is covered by the upper ITO 60. The other configuration is the same as the configuration described with reference to FIG. 7.

Figure 10:
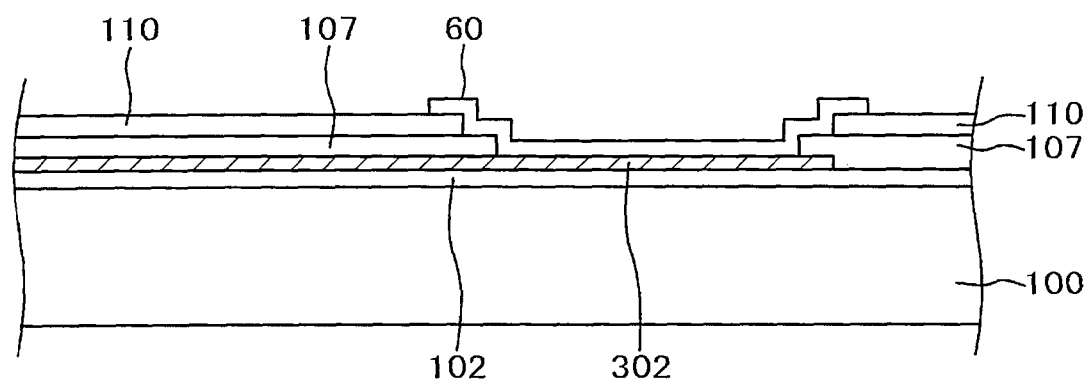
FIG. 10 is a cross-sectional view of a terminal portion when the drain layer lead line is extended to the terminal portion in IPSPRO.

FIG. 10 is an example in which the drain layer lead line 302 extends to the terminal in IPSPRO. The drain layer lead line 302 is formed on the gate insulating film 102 at the same time as the drain electrode 104 and the like. FIG. 10 is different from FIG. 8 in that the inter-layer insulating film 110 is formed on the inorganic passivation film 107 and that the through hole of the terminal portion 34 is formed through the inter-layer insulating film 110, the inorganic passivation film 107, and the gate insulating film 102. Also in FIG. 10, the top layer of the terminal portion 34 is covered by the upper ITO 60. The other configuration is the same as the configuration described with reference to FIG. 8.

With respect to the configurations of the pixel portion and the terminal portion 34 in IPSLITE 1, IPSLITE 2, IPSLITE 3, and IPSPRO, the adjustment of the resistance of the lead line 30 according to the present invention will be described with reference to the following examples.

FIRST EXAMPLE

Figure 11:
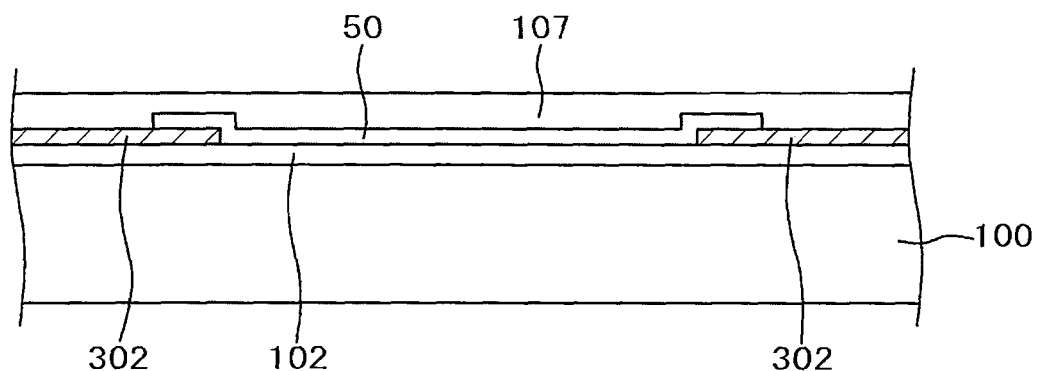
FIG. 11 is a cross-sectional view of the straight wiring portion of the drain layer lead line, in which the lead line is bridged by bridging ITO in IPSLITE 1.

FIG. 11 is a cross-sectional view of the configuration for resistance adjustment in the straight wiring portion 33 in IPSLITE 1. In FIG. 11, the drain layer lead line 302 is used for the lead line 30. In FIG. 11, the drain layer lead line 302 is interrupted in the middle of the straight wiring portion 33, and the gap is connected with the bridging ITO. The bridging ITO is formed at the same time as the pixel electrode 106, namely, a lower ITO 50. In IPSLITE 1, the source electrode 105 is formed prior to the formation of the pixel electrode 106. Thus, in FIG. 11, the lower ITO 50 overlaps a portion of the drain layer lead line 302 to establish connection between them.

As described above, in this example, it is possible to adjust the resistance of the lead line 30 by the lower ITO 50, without using the through hole and the like. The resistance of the lead line 30 can be adjusted by the length of the lower ITO 50. Here, the number of process steps is not increased compared to the case of not using the resistance adjustment configuration. As described above, according to this example, the resistance of the lead line 30 can be adjusted without leading to an increase in the process cost or complexity in IPSLITE 1.

SECOND EXAMPLE

Figure 12:
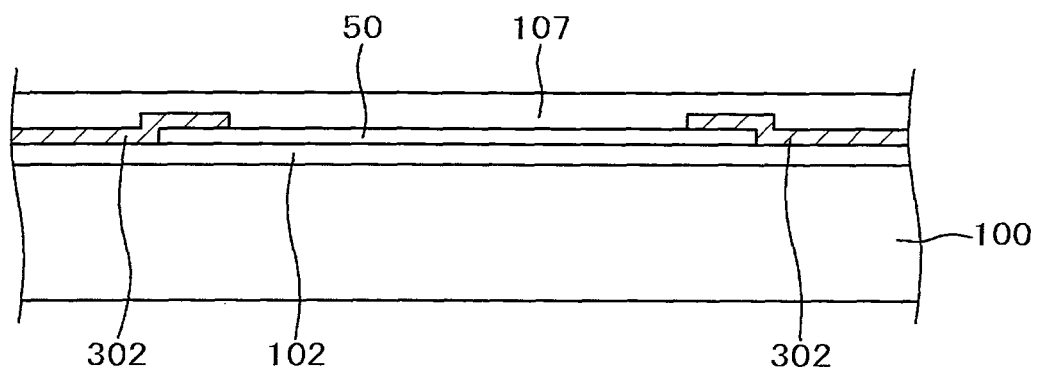
FIG. 12 is a cross-sectional view of the straight wiring portion of the drain layer lead line, in which the lead line is bridged by bridging ITO in IPSLITE 2.

FIG. 12 is a cross-sectional view of the configuration for resistance adjustment in the straight wiring portion 33 in IPSLITE 2. In FIG. 12, the drain layer lead line 302 is used for the lead line 30. FIG. 12 is different from FIG. 11 in that the pixel electrode 106, namely, the lower ITO 50 is formed prior to the formation of the source electrode 105 in IPSLITE 2. Thus, the drain layer lead line 302 in FIG. 12 overlaps a portion of the lower ITO 50 to ensure electrical continuity between the two electrodes. The other configuration and effect are the same as those in the first example.

THIRD EXAMPLE

Figure 13:
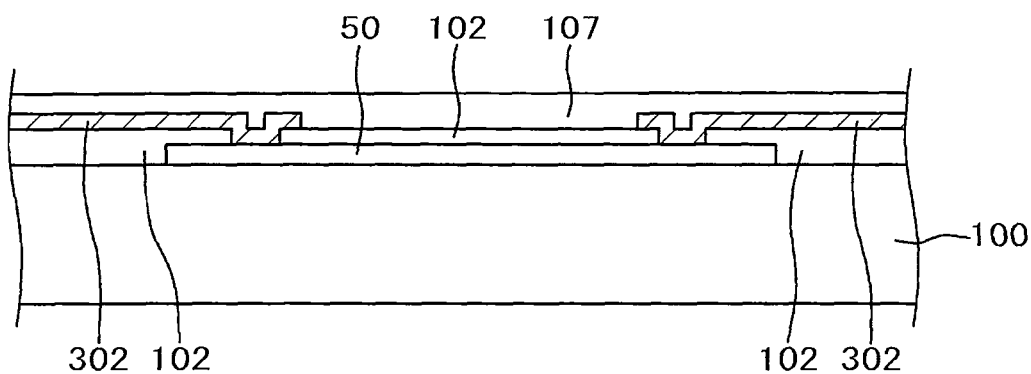
FIG. 13 is a cross-sectional view of the straight wiring portion of the drain layer lead line, in which the lead line is bridged by bridging ITO in IPSLITE 3.

FIG. 13 is a cross-sectional view of the configuration for resistance adjustment in the straight wiring portion 33 in IPSLITE 3. In FIG. 13, the drain layer lead line 302 is used for the lead line 30. In FIG. 13, the pixel electrode 106, namely, the lower ITO 50 is used as the bridging ITO for the resistance adjustment. The resistance of the lead line 30 can be adjusted by the length of the lower ITO 50.

FIG. 13 is different from FIGS. 11 and 12 in that the lower ITO 50 is directly formed on the TFT substrate 100. Thus, a through hole is formed in the gate insulating film 102 to establish connection between the drain layer lead line 302 and the lower ITO 50 for the resistance adjustment. Of course, the lower ITO 50 below the gate insulating film 102 should be patterned and formed before the gate insulating film 102 is attached thereto. However, the patterning of the lower ITO 50 is performed at the same time as the patterning of the pixel electrode 106, so that the number of process steps is not increased. The configuration and effect are the same as those in the first and second examples.

FOURTH EXAMPLE

Figure 14:
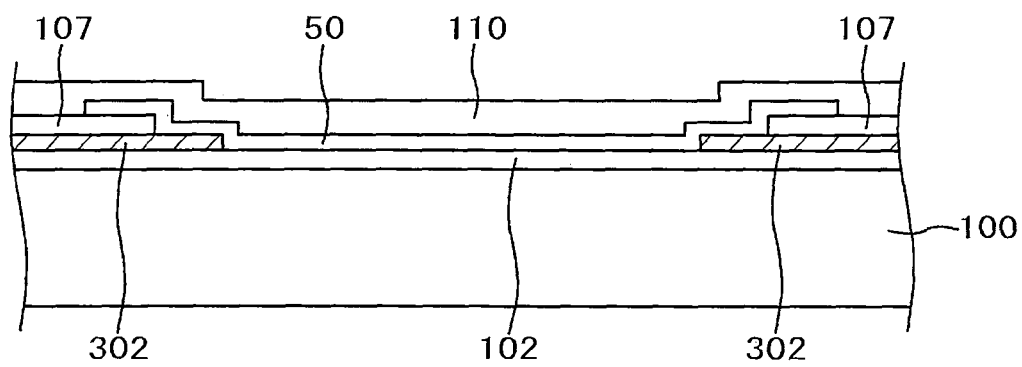
FIG. 14 is a cross-sectional view of the straight wiring portion of the drain layer lead line, in which the lead line is bridged by bridging ITO in IPSPRO.

FIG. 14 is a cross-sectional view of the configuration for resistance adjustment in the straight wiring portion 33 in IPSPRO. In FIG. 14, the drain layer lead line 302 is used for the lead line 30. In FIG. 14, the drain layer lead line 302 is interrupted in the middle of the straight wiring portion 33, and the gap is connected with the bridging ITO. FIG. 14 is different from FIGS. 11 to 13 in that the bridging ITO connecting the gap is the common electrode 108 shown in FIG. 6. The bridging ITO is the common electrode 108, but is also referred to as the lower ITO 50 because it is formed on the lower layer.

FIG. 14 is different from FIGS. 11 to 13 in that the drain layer lead line 302 is covered by the inorganic passivation film 107 and the inter-layer insulating film 110. Further, the common electrode 108 in FIG. 6, namely, the lower ITO 50 in FIG. 14 is formed prior to the formation of the inorganic passivation film 107. Thus, the lower ITO 50 overlaps the end of the inorganic passivation film 107. In FIG. 14, the resistance of the lead line 30 can be adjusted by the length of the lower ITO 50. The effect of FIG. 14 is the same as the effect in the first example or other examples.

FIFTH EXAMPLE

Figure 15:
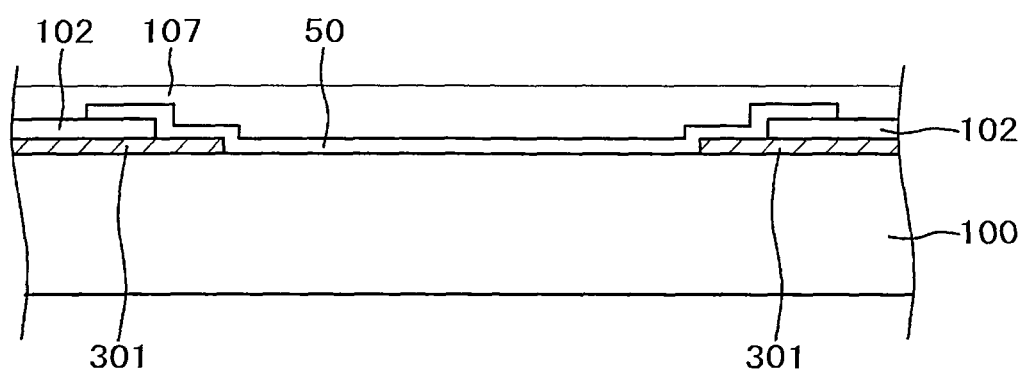
FIG. 15 is a cross-sectional view of the straight wiring portion of the lead line of a scan line, in which the lead line is bridged by bridging ITO in IPSLITE 1.

FIG. 15 is a cross-sectional view of the configuration for resistance adjustment in the straight wiring portion 33 for the case of using the gate layer lead line 301 in IPSLITE 1 or IPSLITE 2. In other words, when the gate layer lead line 301 is used, IPSLITE 1 and IPSLITE 2 have the same configuration. In FIG. 15, the gate layer lead line 301 is interrupted in the middle of the straight wiring portion 33, and the gap is connected with the bridging ITO. The bridging ITO is the lower ITO 50 which is formed at the same time as the pixel electrode 106 in FIG. 3 or FIG. 4. In FIG. 15, the through hole is formed in the gate insulating film 102 to bridge the gate layer lead line 301 by the lower ITO 50. The lower ITO 50 is formed at the same time as the pixel electrode 106. Thus, the lower ITO overlaps a portion of the gate insulating film 102. The lower ITO 50 is covered by the inorganic passivation film 107. Also in this example, the resistance of the lead line 30 can be adjusted by the length of the lower ITO 50.

In this example, the configuration for resistance adjustment of the lead line 30 can be formed at the same time as the pixel portion or the terminal portion 34 is formed. Thus, the number of process steps is not increased. As a result, according to this example, it is possible to provide the resistance adjustment of the lead line 30 without leading to an increase in the process cost.

SIXTH EXAMPLE

Figure 16:
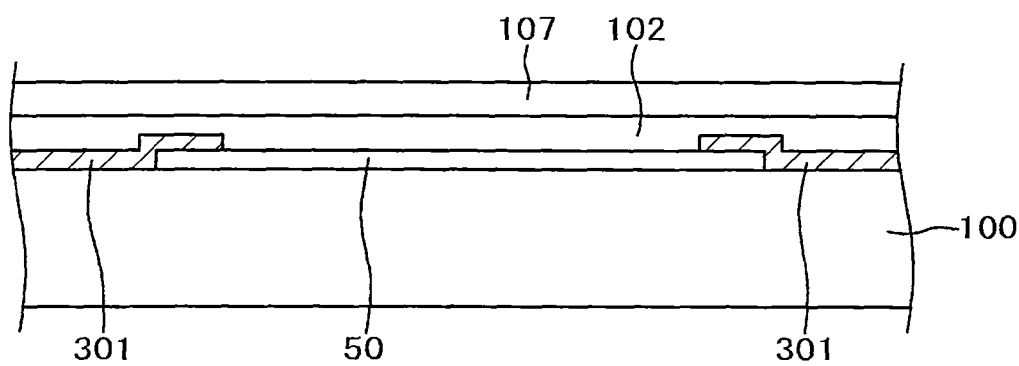
FIG. 16 is a cross-sectional view of the straight wiring portion of the lead line of the scan line, in which the lead line is bridged by bridging ITO in IPSLITE 2.

FIG. 16 is a cross-sectional view of the configuration for resistance adjustment in the straight wiring portion 33 in the case of using the gate layer lead line 301 in IPSLITE 3. In IPSLITE 3, the pixel electrode 106, namely, the lower ITO 50, and the gate electrode 101, namely, the gate layer lead line 301 are formed in the same layer. Thus, the resistance adjustment can be achieved by the bridging ITO without using the through hole. The resistance of the lead line 30 can be adjusted by the length of the lower ITO 50. In FIG. 16, first the lower ITO 50 is formed, and then the gate layer lead line 301 is formed. Thus, the gate layer lead line 301 overlaps a portion of the lower ITO 50 to ensure electrical continuity between the two electrodes.

In this example, there is no need to form the through hole for the resistance adjustment of the lead line 30. Thus, this example has the advantage that the configuration can be made simpler than the configuration of the fifth example. According to this example, the resistance of the lead line 30 can be adjusted without leading to an increase in process cost.

SEVENTH EXAMPLE

Figure 17:
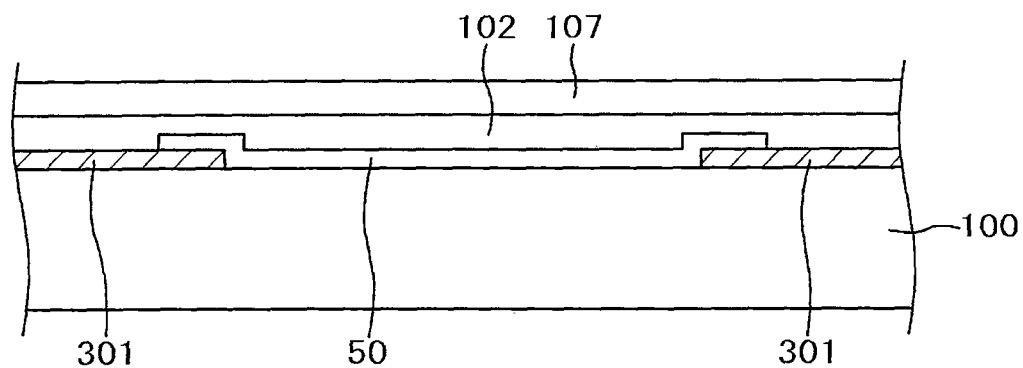
FIG. 17 is a cross-sectional view of the straight wiring portion of the lead line of the scan line, in which the lead line is bridged by bridging ITO in IPSLITE 3.

FIG. 17 is a cross-sectional view of another configuration for resistance adjustment in the straight wiring portion 33 for the case of using the gate layer lead line 301 in IPLSITE 3. FIG. 17 is different from FIG. 16 in that the source electrode 105 or the gate layer lead line 301 is formed prior to the formation of the pixel electrode 106 or the lower ITO 50. Thus, the lower ITO 50 overlaps a portion of the gate layer lead line 301 to establish connection between the lower ITO 50 and the gate layer lead line 301. The effect of this example is the same as the effect of the sixth example.

EIGHTH EXAMPLE

Figure 18:
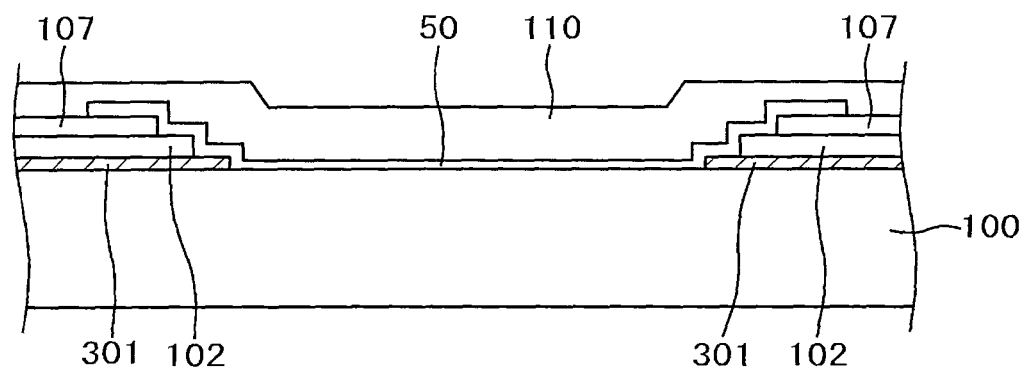
FIG. 18 is a cross-sectional view of the straight wiring portion of the lead line of the scan line, in which the lead line is bridged by bridging ITO in IPSPRO.

FIG. 18 is a cross-sectional view of yet another configuration for resistance adjustment in the straight wiring portion 33 for the case of using the gate layer lead line 301 in IPSPRO. FIG. 18 is different from the fifth example shown in FIG. 15 in that the inorganic passivation film 107 and the inter-layer insulating film 110 are present on the gate insulating film 102. Then, the gate layer lead line 301 is bridged by the bridging ITO, which is the lower ITO 50 that is formed at the same time as the common electrode 108 in FIG. 6. In FIG. 15 described above, the bridging ITO for the resistance adjustment is formed at the same time as the pixel electrode 106, but is still the lower ITO 50. The resistance of the lead line 30 is adjusted by the length of the lower ITO 50.

In FIG. 6, the common electrode 108 is formed on the organic passivation film 109. However, the inorganic passivation film 109 is removed from the portion of the lead line 30. Thus, in FIG. 18, the lower ITO 50 is formed on the inorganic passivation film 107 in which the through hole is formed. Also in this example, the configuration for the resistance adjustment can be formed at the same time as the pixel portion or the terminal portion 34. Thus, the resistance adjustment of the lead line 30 can be achieved without an increase in process cost.

NINTH EXAMPLE

Figure 19:
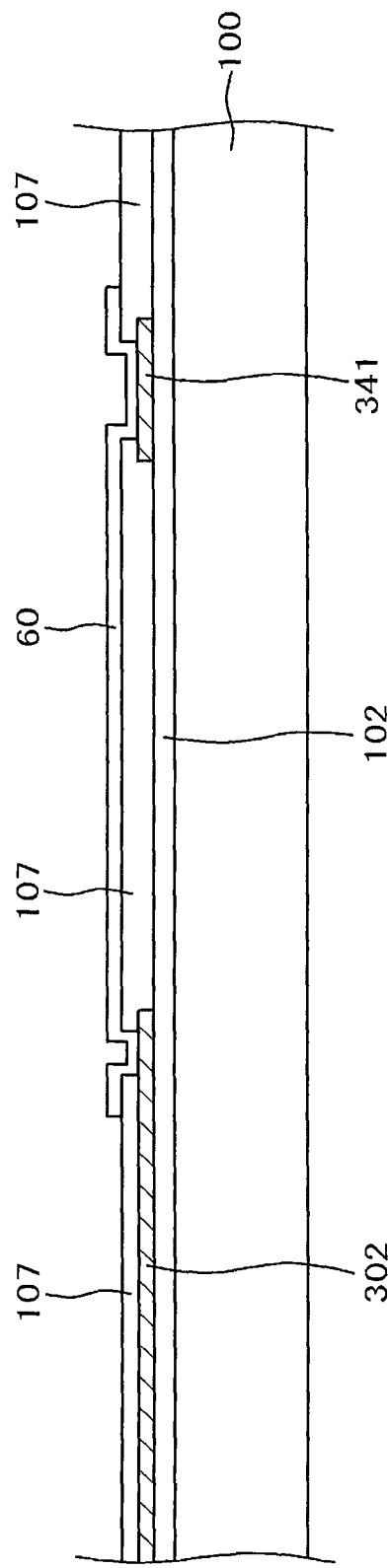
FIG. 19 is a cross-sectional view of an example in which the resistance of the drain layer lead line is adjusted by ITO in the terminal portion in IPSLITE 1, IPSLITE 2, and IPSLITE 3.

FIG. 19 is a cross-sectional view of the configuration for adjusting the resistance of the lead line 30 in the terminal portion 34 shown in FIG. 2, with respect to the liquid crystal display device of IPSLITE 1, IPSLITE 2, and IPSLITE 3. FIG. 19 is an example of using the drain layer lead line 302. In FIG. 19, the gate insulating film 102 is formed on the TFT substrate 100, on which the drain layer lead line 302 extends from the display area 10 on the left side. The drain layer lead line 302 does not extend to the terminal and is interrupted in the middle. The gap between the drain layer lead line 302 and the terminal portion 34 is bridged by the upper ITO 60 that is formed at the same time as the common electrode 108.

In the terminal of FIG. 19, there is a terminal metal 341 formed at the same time as the source electrode 105 or the drain layer lead line 302 on the gate insulating film 102. The upper ITO 60 covers the terminal metal 341 to form the terminal. The resistance of the lead line 30 can be adjusted by the length of the upper ITO 60. Also in the configuration of this example, the resistance adjustment of the lead line 30 can be achieved without an increase in the number of existing process steps.

TENTH EXAMPLE

Figure 20:
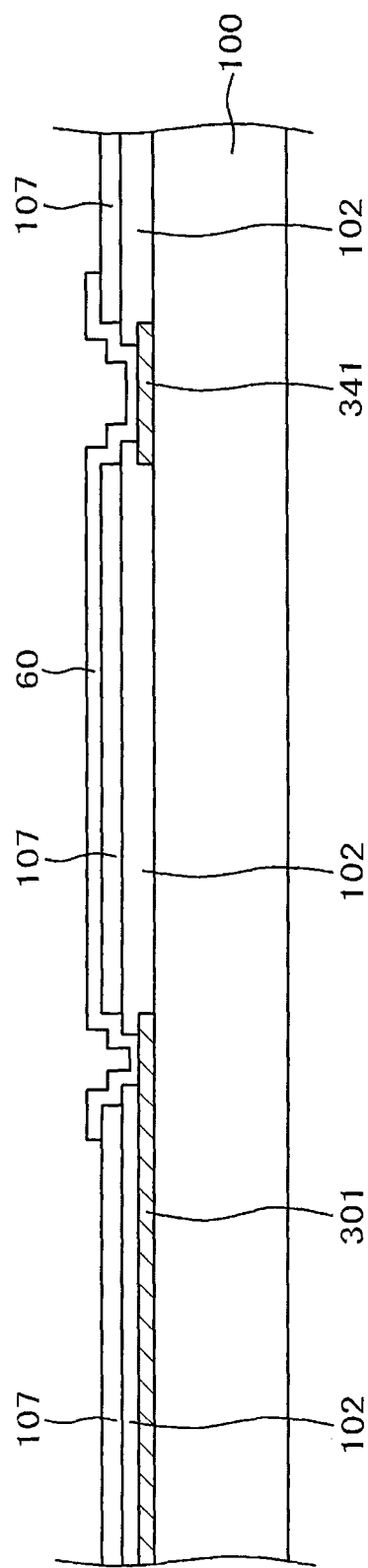
FIG. 20 is a cross-sectional view of an example in which the resistance of the gate layer lead line is adjusted by ITO in the terminal portion in IPSLITE 1, IPSLITE 2, and IPSLITE 3.

FIG. 20 is a cross-sectional view of the configuration for adjusting the resistance of the lead line 30 in the terminal portion 34 shown in FIG. 2, with respect to the liquid crystal display device of IPSLITE 1, IPSLITE 2, and IPSLITE 3. FIG. 20 is an example in which the gate layer lead line 301 is used for the lead line 30. In FIG. 20, the gate layer lead line 301 and the terminal metal 341 are formed at the same time as the gate electrode 101 on the TFT substrate 100. The gate layer lead line 301 does not extend to the terminal. The gap between the gate layer lead line 301 and the terminal is bridged by the upper ITO 60 that is formed at the same time as the common electrode 108. The resistance of the lead line 30 can be adjusted by the length of the upper ITO 60. Also in this example, the resistance of the lead line 30 can be adjusted in the same process as the existing process.

ELEVENTH EXAMPLE

Figure 21:
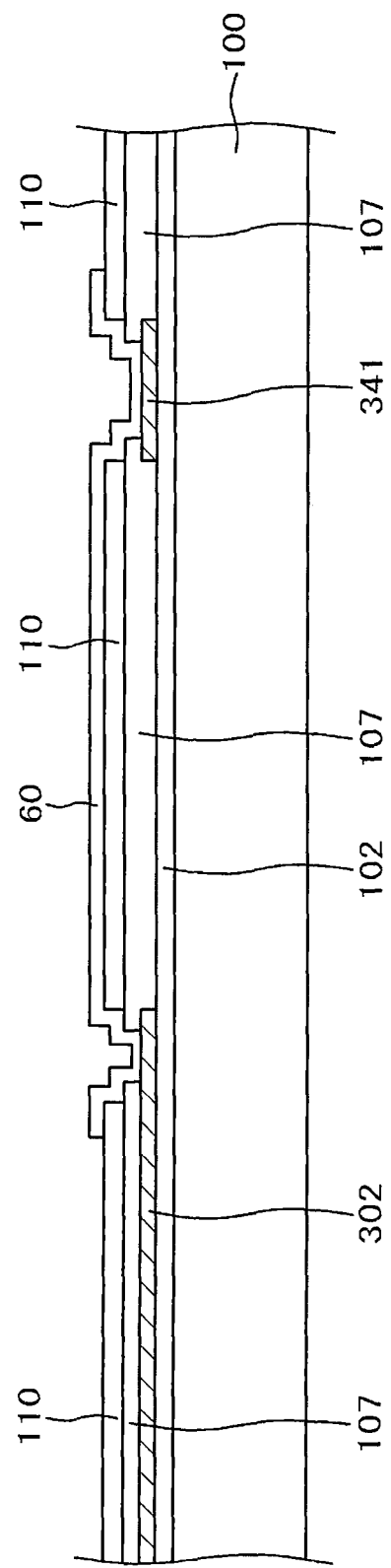
FIG. 21 is a cross-sectional view of an example in which the resistance of the drain layer lead line is adjusted by ITO in the terminal portion in IPSPRO.

FIG. 21 is a cross-sectional view of the configuration for adjusting the resistance of the lead line 30 in the terminal portion 34 shown in FIG. 2, with respect to the liquid crystal display device of IPSPRO. FIG. 21 is an example of using the drain layer lead line 302. FIG. 21 is different from FIG. 19 in that the inter-layer insulating film 110 is present on the inorganic passivation film 107 and that the upper ITO 60, which is formed at the same time as the pixel electrode 106 in FIG. 6, overlaps a portion of the inter-layer insulating film 110. Also in this example, the resistance of the lead line 30 can be adjusted by the length of the upper ITO 60. The other effect is the same as the effect in FIG. 19.

TWELFTH EXAMPLE

Figure 22:
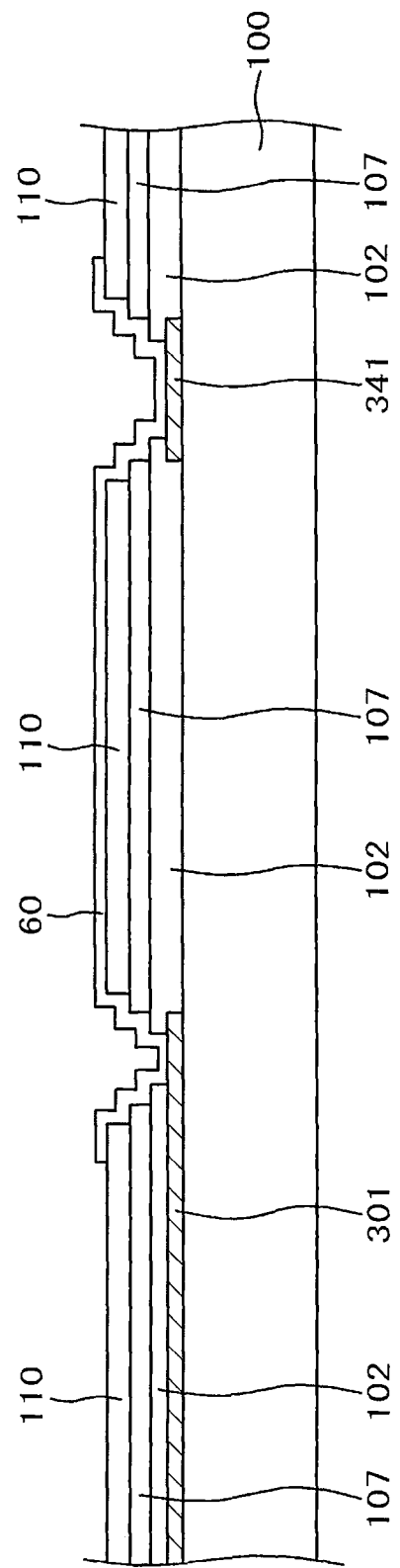
FIG. 22 is a cross-sectional view of an example in which the resistance of the gate layer lead line is adjusted by ITO in the terminal portion in IPSPRO.

FIG. 22 is a cross-sectional view of the configuration for adjusting the resistance of the lead line 30 in the terminal portion 34 shown in FIG. 2, with respect to the liquid crystal display device of IPSPRO. FIG. 22 is an example in which the gate layer lead line 301 is used for the lead line 30. In FIG. 22, the gate layer lead line 301 and the terminal metal 341 are formed at the same time as the gate electrode 101 on the TFT substrate 100. FIG. 22 is different from FIG. 20 in that the through hole for connecting the gate layer lead line 301 to the terminal is formed with respect to the three layers: the gate insulating film 102, the inorganic passivation film 107, and the inter-layer insulating film 110. Further, the upper ITO 60 for bridging the gap between the gate layer lead line 301 and the terminal is formed at the same time as the pixel electrode 106 shown in FIG. 6. Thus, the upper ITO 60 overlaps a portion of the inter-layer insulating film 110. The resistance of the lead line 30 can be adjusted by the length of the upper ITO 60. The other effect is the same as the effect of the eleventh example.

THIRTEENTH EXAMPLE

Figure 23:
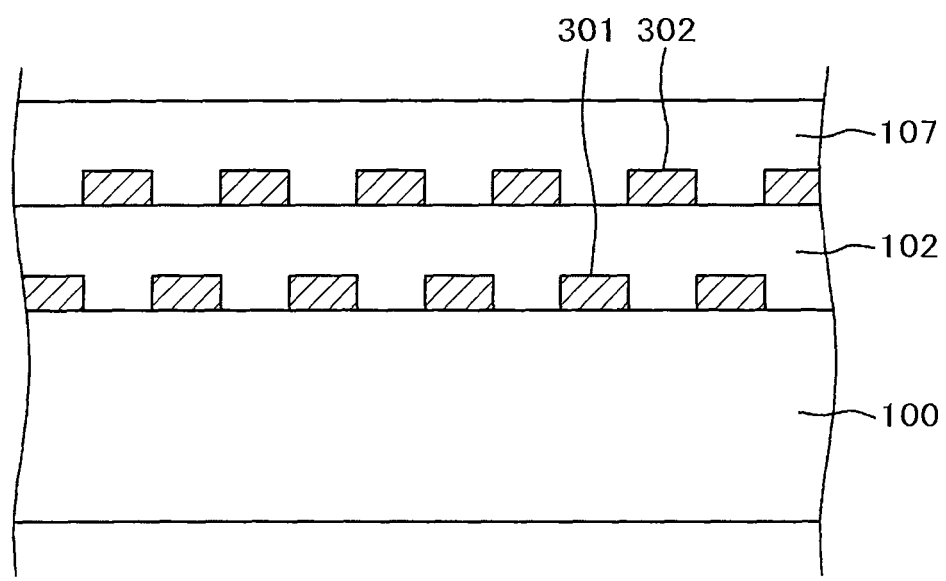
FIG. 23 is a cross-sectional view of an example in which the lead lines are arranged in a multi-layer wiring structure.

When the screen is high definition, the pitch of the image signal lines and the scan lines in the display area 10 is reduced. When the pitch is reduced, it is difficult to have enough space between lines on the side of the lead line 30. In order to solve this problem, the lead lines 30 are arranged in a multi-layer wiring structure as shown in FIG. 23. In other words, for example, in the connecting portion 31 of the image signal lines and the lead lines 30 in FIG. 2, the lead lines 30 are arranged alternately on the layer of the drain layer lead line 302 and on the layer of the gate layer lead line 301. In this way, the lead lines 30 are formed in such a manner that the gate layer lead lines 301 and the drain layer lead lines 302 are arranged alternately.

FIG. 23 shows the state of the arrangement described above. FIG. 23 is a cross-sectional view in the arrangement direction of the lead lines 30. In FIG. 23, the gate layer lead lines 301 are formed on the TFT substrate 100. On the gate insulating film 102 covering the gate layer lead lines 301, the drain layer lead lines 302 are formed so as to be staggered with respect to the gate layer lead lines 301. Then, the inorganic passivation film 107 is formed and covers the drain layer lead lines 302. In FIG. 23, an image signal is applied to both the gate layer lead lines 301 and the drain layer lead lines 302, both of which are connected to the image signal lines in the connecting portion 31. Note that the basic configuration is the same as the case in which the lead lines 30 are connected to the scan lines in the connecting portion 31.

The switching from the image signal line to the gate layer lead line 301 or the switching from the scan line to the drain layer lead line 302 is done by the bridging ITO. Thus, it is possible to adjust the resistance of the lead line 30 by adjusting the length of the bridging ITO in the connecting portion 31. Up to now, the switching from the drain layer lead line 302 to the gate layer lead line 301 or the switching from the gate layer lead line 301 to the drain layer lead line 302 has been done by the upper ITO 60. Even in the case of the switching by the upper ITO 60, it is possible to adjust the resistance of the lead line 30 by adjusting the length of the upper ITO 60.

On the other hand, in the case of IPSLITE 3, the pixel electrode 106 of ITO, as well as the gate electrode 101 or the lead line of the scan line are formed on the same layer as the gate layer. Thus, there is no need to form a through hole to connect the lower ITO 50, which is formed at the same time as the pixel electrode 106, to the gate layer lead line 301. Because there is no need to form the through hole, the space of the through hole can be saved when viewed from the top. At this point, IPSLITE 3 is advantageous.

Figure 24:
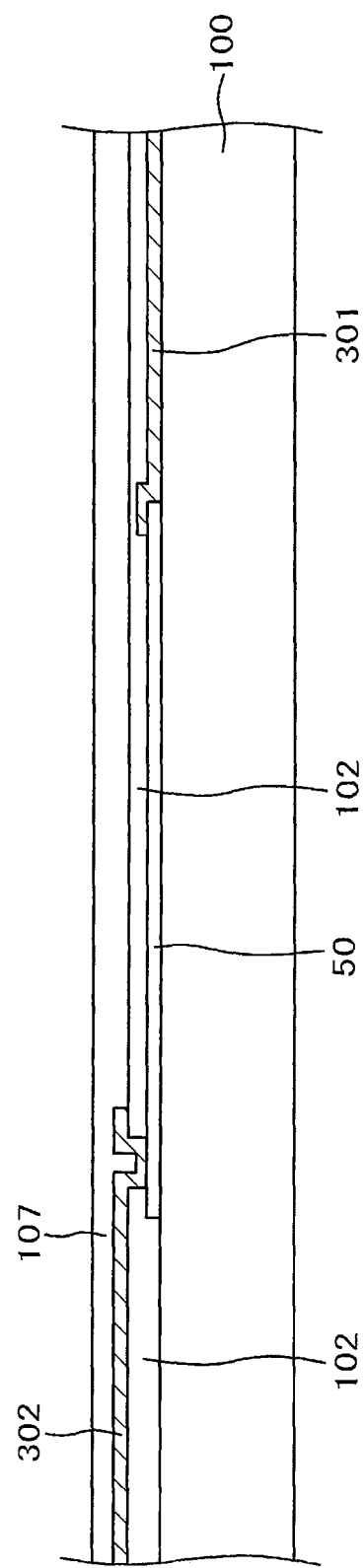
FIG. 24 is a cross-sectional view of an example in which the resistance of the lead line is adjusted by bridging ITO in the connecting portion in IPSLITE 3.
Figure 25:
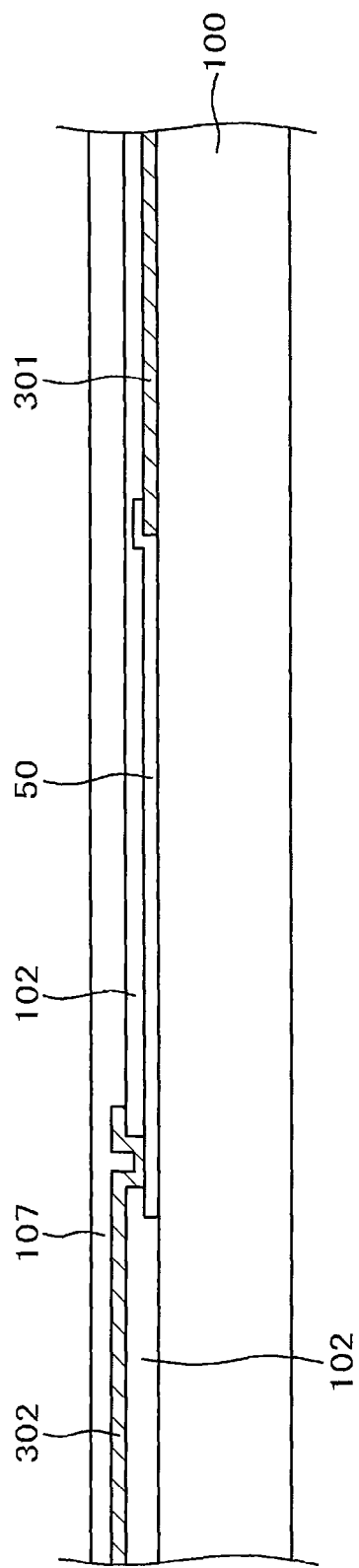
FIG. 25 is a cross-sectional view of another example in which the resistance of the lead line is adjusted by bridging ITO in the connecting portion in IPSLITE 3.

FIG. 24 is an example of adjusting the resistance of the lead line 30 by the lower ITO 50 in the configuration of IPSLITE 3. In this example, the drain layer lead line 302 is switched to the gate layer lead line 301 through the lower ITO 50 that is formed at the same time as the pixel electrode 106. The example of FIG. 24 shows that the pixel electrode 106 is formed prior to the formation of the gate electrode 101. Thus, in FIG. 24, the gate layer lead line 301 overlaps a portion of the lower ITO 50 to establish connection between the gate layer lead line 301 and the lower ITO 50. FIG. 25 is an example in which the gate electrode 101 is formed prior to the formation of the lower ITO 50 in IPSLITE 3. Thus, in FIG. 25, the lower ITO 50 overlaps a portion of the gate layer lead line 301 to establish connection between the lower ITO 50 and the gate layer lead line 301. The other configuration and operation are the same as those in FIG. 24.

Figure 26:
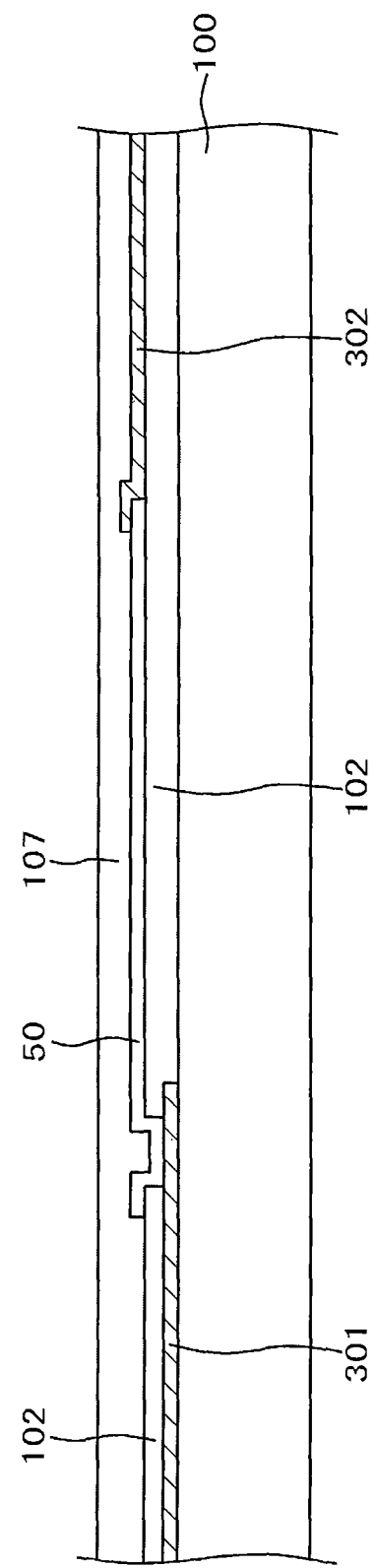
FIG. 26 is a cross-sectional view of an example in which the resistance of the lead line is adjusted by bridging ITO in the connecting portion in IPSLITE 2.

FIG. 26 is an example of adjusting the resistance of the lead line 30 by the lower ITO 50 in IPSLITE 1. In this example, the gate layer lead line 301 is switched to the drain layer lead line 302 through the lower ITO 50. In FIG. 26, the drain layer lead line 302 overlaps a portion of the lower ITO 50 to establish connection between the lower ITO 50 and the drain layer lead line 302, without using the through hole. This is because, in IPSLITE 1, the pixel electrode 106 is formed prior to the formation of the source electrode 106 or the drain layer lead line 302.

Figure 27:
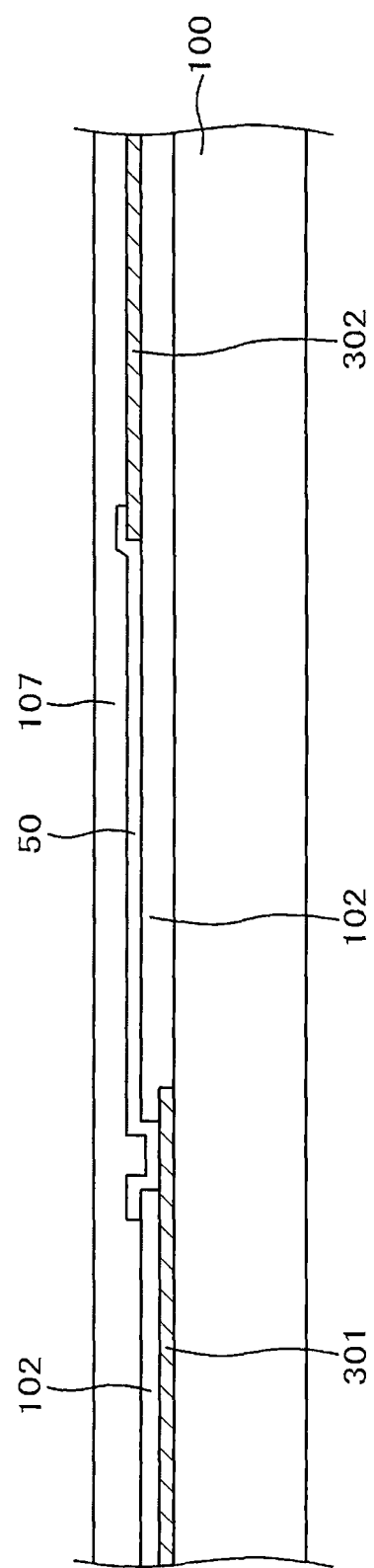
FIG. 27 is a cross-sectional view of an example in which the resistance of the lead line is adjusted by bridging ITO in the connecting portion in IPSLITE 1.
Figure 28:
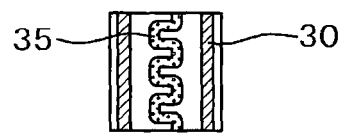
FIG. 28 is an example of a method of adjusting the resistance of the lead line in a conventional example.

FIG. 27 is an example of adjusting the resistance of the lead line 30 by the lower ITO 50 in IPSLITE 2. In this example, the gate layer lead line 301 is switched to the drain layer lead line 302 through the lower ITO 50. The operation is the same as the operation in FIG. 26. In IPSLITE 2, the source electrode 105 or the drain layer lead line 302 is formed prior to the formation of the pixel electrode 106 or the lower ITO 50. Thus, the lower ITO 50 overlaps a portion of the drain layer lead line 302 to establish connection between the lower ITO 50 and the drain layer lead line 302. In FIGS. 26 and 27, the bridging ITO is connected again to the drain layer lead line 302 without using the through hole. Thus, in this example there is no need to form the through hold, so that the space of the through hole can be saved when viewed from the top.

What is claimed is:

1. A liquid crystal display device comprising:
   a first substrate and a second substrate,
   the first substrate comprising:
      a plurality of scanning lines and a plurality of image signal lines,
      a display area, which is formed where the first substrate and the second substrate overlap,
      a terminal region, which is formed where the first substrate and the second substrate do not overlap,
      a plurality of terminals, arranged on the terminal region, to input signals to the image signal line, and
      lead lines, formed between the image signal lines and the terminals,
   wherein a first insulating layer and a second insulating layer are formed in the terminal region,
   the lead lines have first lead lines formed between the first substrate and the first insulating layer, and second lead lines formed between the first insulating layer and the second insulating layer in the terminal region,
   wherein, in the terminal region, the first lead lines and the second lead lines have connecting portions connecting to the image signal lines, inclined line portions extending in an oblique direction to the image signal lines, and straight line portions connecting to the terminals, the inclined line portions are arranged between the connecting portions and the straight line portions,
   wherein:
      each of the straight line portions is constituted by a first line and a second line, in a direction to each of the terminals,
      the first line and the second line are separated by an opening,
      the first line is formed on one of the first insulating layer or the second insulating layer,
      the second line is formed on another of the first insulating layer or the second insulating layer,
      a bridging ITO is arranged in the opening,
      the bridging ITO is connected to one of the first line or the second line without passing through a contact hole at one side, and
      the bridging ITO is connected to another of the first line or the second line through a contact hole at another side.

2. The liquid crystal display device according to claim 1, wherein the first lead lines and the second lead lines are alternately arranged in the terminal region.

3. The liquid crystal display device according to claim 1, wherein:
   the scanning lines and the image signal lines are formed on different layers, and
   the first lead lines are formed on the same layer as the scanning lines, and the first lead lines are connected to the image signal lines at the connecting portions.

4. The liquid crystal display device according to claim 1, wherein:
   the scanning lines and the image signal lines are formed on different layers, and
   the second lead lines are formed on the same layer as the image signal line, and the second lead lines are connected to the image signal lines at the connection portions.

5. A liquid crystal display device comprising:
   a first substrate and a second substrate,
   the first substrate comprising:
      a plurality of scanning lines and a plurality of image signal lines,
      a display area, which is formed where the first substrate and the second substrate overlap,
      a terminal region, which is formed where the first substrate and the second substrate do not overlap,
      a plurality of terminals, arranged on the terminal region, to input signals to the scanning lines, and
      lead lines, formed between the scanning lines and the terminals,
   wherein a first insulating layer and a second insulating layer are formed in the terminal region,
   the lead lines have first lead lines arranged between the first substrate and the first insulating layer, and second lead lines arranged between the first insulating layer and the second insulating layer in the terminal region, wherein, in the terminal region, the first lead lines and the second lead lines have connection portions connecting to the image signal lines, inclined line portions extending in an oblique direction to the image signal lines, and straight line portions connecting to one of the terminals, the inclined line portions are arranged between the connecting portions and the straight line portions, wherein:
- each of the straight line portions is constituted by a first line and a second line, in a direction to each of the terminals,
- the first line and the second line are separated by an opening,
- the first line is formed on one of the first insulating layer or the second insulating layer,
- the second line is formed on another of the first insulating layer or the second insulating layer,
- a bridging ITO is arranged in the opening,
- the bridging ITO is connected to one of the first line or the second line without passing through a contact hole at one side, and
- the bridging ITO is connected to another of the first line or the second line through a contact hole at another side.

6. The liquid crystal display device according to claim 5, wherein the first lead lines and the second lead lines are alternately arranged in the terminal region.

7. The liquid crystal display device according to claim 6, wherein:
- the scanning lines and the image signal lines are formed on different layers, and
- the first lead lines are formed on the same layer as the scanning lines, and the first lead lines are connected to the scanning lines at the connection portions.

8. The liquid crystal display device according to claim 6, wherein:
- the scanning lines and the image signal lines are formed on different layers, and
- the second lead lines are formed on the same layer as the image signal line, and the second lead lines are connected to the image signal lines at the connection portions.

* * * * *